United States Patent

Bastow

[11] Patent Number: 5,413,637
[45] Date of Patent: May 9, 1995

[54] MASKING METHODS USING A FOAM WEB

[75] Inventor: David R. Bastow, Tamworth, England

[73] Assignee: Minnesota Mining and Manufacturing Company, St. Paul, Minn.

[21] Appl. No.: 122,494

[22] PCT Filed: Mar. 13, 1992

[86] PCT No.: PCT/US92/02030
§ 371 Date: Sep. 28, 1993
§ 102(e) Date: Sep. 28, 1993

[87] PCT Pub. No.: WO92/18252
PCT Pub. Date: Oct. 29, 1992

[30] Foreign Application Priority Data
Apr. 19, 1991 [GB] United Kingdom ............. 9108385.7

[51] Int. Cl.⁶ ..................... B32B 1/00; B32B 3/00
[52] U.S. Cl. ..................... 118/505; 118/504; 428/40; 428/43; 428/317.3; 428/343
[58] Field of Search ......... 428/317.3, 343, 43, 428/40, 354; 118/505, 504; 156/241, 250, 71, 267

[56] References Cited

U.S. PATENT DOCUMENTS

| | | | |
|---|---|---|---|
| 1,960,137 | 5/1934 | Brown | 154/43 |
| 2,363,842 | 9/1942 | Duggan | 118/505 |
| 3,032,433 | 5/1962 | Lewis et al. | 117/38 |
| 3,117,902 | 1/1964 | Holzheimer | 156/217 |
| 3,123,656 | 3/1964 | Rochlin | 264/321 |
| 3,271,232 | 9/1966 | Moore | 161/175 |
| 3,629,034 | 12/1971 | Kuroda | 156/219 |
| 3,724,420 | 4/1973 | Quinn | 118/505 |
| 3,844,876 | 10/1974 | Wilson et al. | 161/119 |
| 3,869,831 | 3/1975 | Gibb | 51/75 |
| 4,024,837 | 5/1977 | Snyder | 118/505 |
| 4,420,520 | 12/1983 | Jones | 118/505 X |
| 4,430,137 | 2/1984 | Jones | 156/247 |
| 4,714,633 | 12/1987 | Horiki et al. | 427/282 |
| 4,740,256 | 4/1988 | Vosberg | 156/73.1 |
| 4,764,421 | 8/1988 | Horiki et al. | 428/35 |
| 4,789,579 | 12/1988 | Tutas | 118/504 |
| 4,822,650 | 4/1989 | Horiki | 428/317.3 X |
| 4,835,026 | 5/1989 | Horiki | 428/43 X |
| 4,898,758 | 2/1990 | Lipson | 118/505 X |
| 4,988,550 | 1/1991 | Keyser | 118/505 X |
| 4,996,092 | 2/1991 | Francis et al. | 428/157 |
| 5,128,176 | 7/1992 | Schmidt | 427/140 |
| 5,164,238 | 11/1992 | Horiki et al. | 428/43 |
| 5,230,738 | 7/1993 | Wheeler | 118/505 |
| 5,260,097 | 11/1993 | Silvestre | 427/282 |

FOREIGN PATENT DOCUMENTS

| | | |
|---|---|---|
| 0256782 | 8/1987 | European Pat. Off. . |
| 0257872 | 8/1987 | European Pat. Off. . |
| 0262946 | 4/1988 | European Pat. Off. . |
| 0263637 | 4/1988 | European Pat. Off. . |
| 0305219 | 8/1988 | European Pat. Off. . |
| 2042417 | 2/1971 | France . |
| 2362584 | 6/1975 | Germany . |
| 2611631 | 6/1977 | Germany . |
| 849774 | 9/1960 | United Kingdom . |
| WO90/15668 | 6/1990 | WIPO . |

Primary Examiner—David A. Simmons
Assistant Examiner—Charles Rainwater
Attorney, Agent, or Firm—William L. Huebsch; Walter N. Kirn; Gary L. Griswold

[57] ABSTRACT

A masking element comprising a foam web formed into a closed curve defining upper and lower surfaces with a layer of adhesive on at least its lower surface for mounting the element on a substrate.

9 Claims, 2 Drawing Sheets

MASKING METHODS USING A FOAM WEB

TECHNICAL FIELD

The present invention relates to the masking of an exposed area of a surface from an adjacent area to facilitate treatment of the exposed area by for example paint spraying. The invention has particular, but not exclusive application in the motor industry where selective repairs must be effected on painted surfaces. The invention also relates to a masking element for use in such methods.

BACKGROUND ART

Various masking techniques are known for isolating areas from adjacent areas on a surface. Such isolation is needed in a number of situations where treatment of one form or another is to be applied exclusively to a specific area or region. Masking techniques are particularly useful when the treatment involves the application of a fluid medium. Examples are chemical treatments, painting and decorating. Typically, the treatment areas are isolated from their surroundings by a masking tape which defines the boundary thereof.

DISCLOSURE OF INVENTION

The present invention is directed at a masking element which can be manufactured and sold as a complete unit ready for immediate use. More particularly, the invention provides a masking element comprising a foam web formed into a closed curve defining upper and lower surfaces, with a layer of adhesive on at least the lower surface for mounting the element on a substrate. The closed curve is typically circular or elliptical, but can be polygonal or any chosen shape. The actual form of the curve is not critical, but is preferably chosen such that a plurality of elements can be formed simultaneously from a single sheet of material. Such a plurality of elements can be arranged concentrically, and stamped from such a sheet simultaneously. Further, such a plurality of elements can be marketed in this form, with elements being available for removal from the sheet as they are required.

Preferred masking elements according to the invention are formed from a foam material, and can conveniently be stamped from a sheet of foam which already has a layer of adhesive on at least one face thereof. The inner and outer peripheries of the element can be defined by pressure welded seams formed during the stamping, and where a plurality of concentric elements are formed simultaneously, radially adjacent elements can be attached to each other along their respective peripheries, and by such pressure welded seams, which may be readily tearable.

BRIEF DESCRIPTION OF DRAWINGS

The invention will now be described by way of example and with reference to the accompanying schematic drawings wherein.

DETAILED DESCRIPTION

Figure 1:
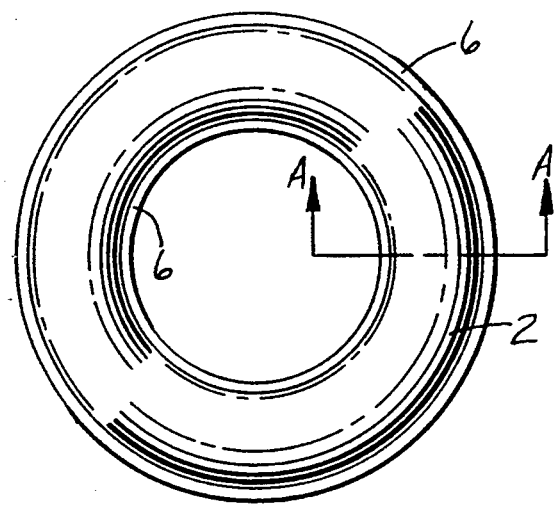
FIG. 1 is a plan view of a circular masking element according to the invention.
Figure 2:
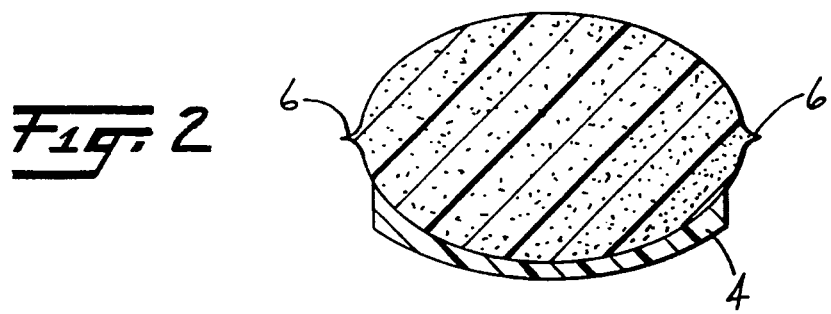
FIG. 2 is a section taken on line A—A of FIG. 1.

As shown in FIGS. 1 and 2, a masking element according to the invention takes the form of an endless length 2 of foam web having a generally elliptical cross-section. On the lower surface of the web 2 is applied an adhesive coating 4, which as can be seen from FIG. 2, extends around substantially half the peripheral surface of the web 2. A typical height of the section shown in FIG. 2 is 15 mm, and a typical breadth is 20 mm. These are preferred minimum values for webs made from polyether foam which is particularly suitable, but other plastics foams can also be satisfactory. Similarly, a typical minimum outside diameter for a masking element of the kind shown in FIG. 1 is 95 mm, which enables the element to isolate an area of around 70 cm$^2$.

The foam web forming the mask element shown in FIGS. 1 and 2 is as noted above, preferably a plastics foam. Typically, it can be a foam made in accordance with our published European Patent Specification No. 0384626, with pressure welded seams 6 defining either lateral side of the web section. Forming the element in this way makes it particularly suitable for batch production, in which a plurality of elements can be simultaneously stamped out of a sheet of foam material, broadly as illustrated in FIG. 3.

Figure 3:
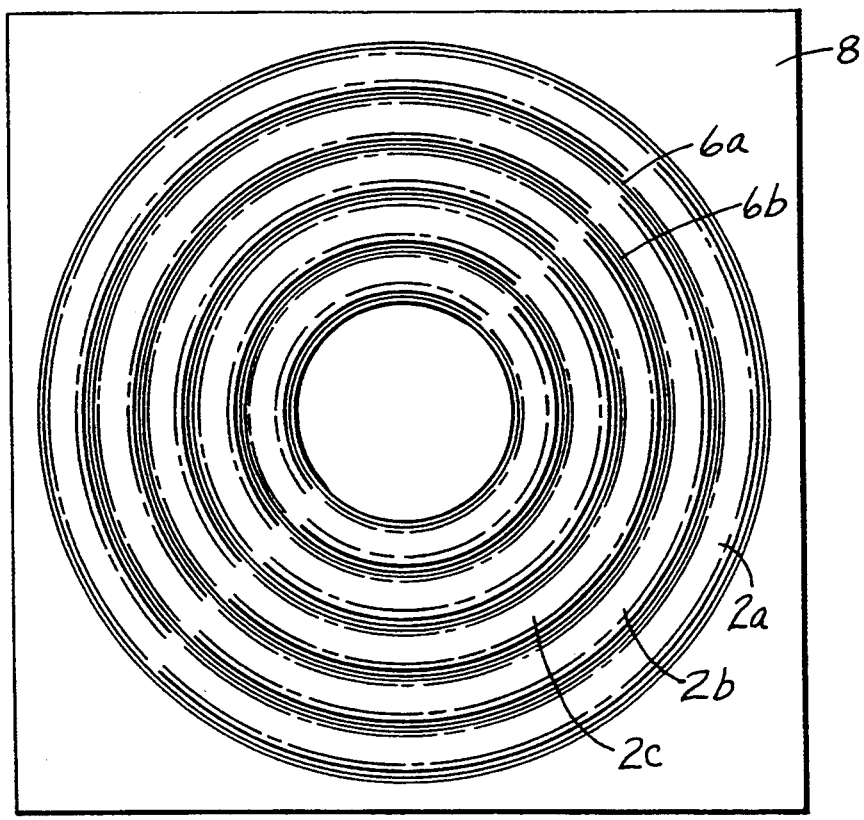
FIG. 3 is a plan view of a sheet of material in which a plurality of masking elements of the invention have been stamped out.

In FIG. 3 five concentric elements are shown formed in a sheet 8 of foam material. The webs 2a, 2b and 2c of radially adjacent elements are separated from one another by pressure welded seams 6a and 6b. The seams are tearable, but as shown the sheet 8 remains intact under normal handling conditions. When one of the elements is required, its respective seams are torn to separate it from the remainder of the sheet.

The sheet 8 shown in FIG. 3 may have a layer 4 of adhesive (not shown) coated thereon prior to it being stamped to identify the respective masking elements. After stamping, and as shown in FIG. 2. The material contracts around the body of each web 2 resulting in the adhesive coating 4 extending around either side of the web. It will be appreciated that an adhesive coating of this form may be applied to both surfaces of the foam 8, to result in a web likewise having two adhesive coatings. The adhesive coatings need not be of the same aggressive strength. Reference is directed to our copending Application filed today in respect of an invention relating to the use of strips similar to the web 2 described herein with two adhesive coatings. Release liners can also be applied to the sheet 8 to facilitate handling not only of the sheet, but also of the masking elements formed therein. If desired, the release liners can be cut into separate rings, or perforated to permit easy separation.

Figure 4:
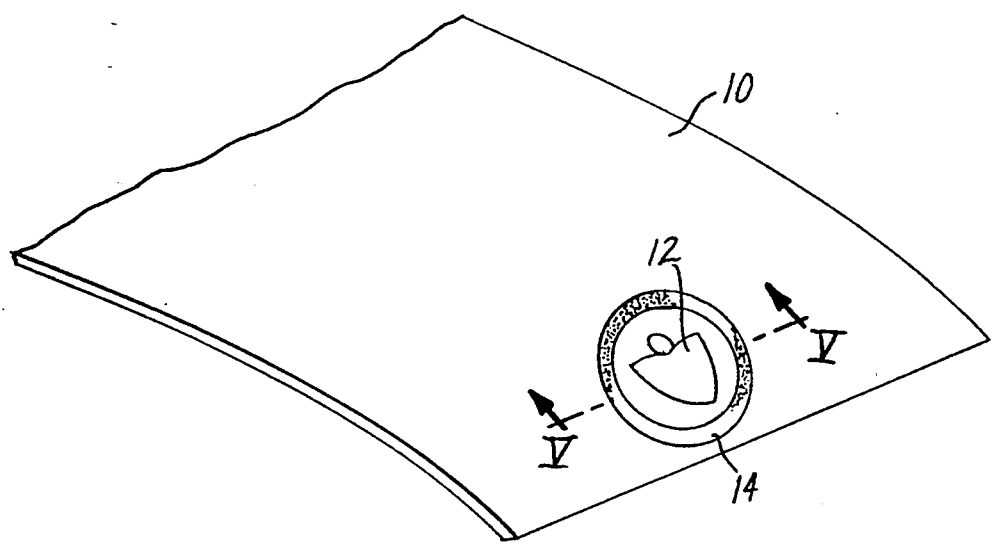
FIG. 4 is a perspective view of a part of a car hood.
Figure 5:
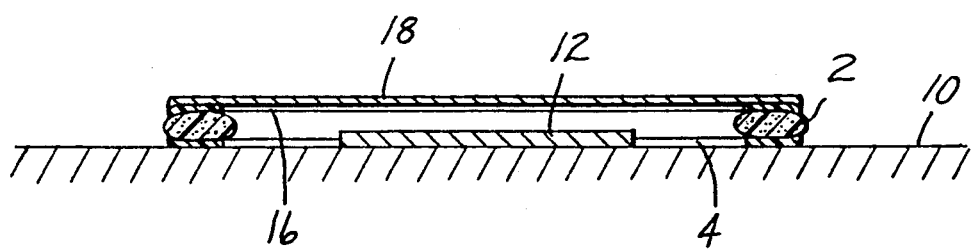
FIG. 5 is cross-section taken on line V—V of FIG. 4.

FIGS. 4 and 5 illustrate the use of a masking element according to the invention. FIG. 4 shows the front section of a car hood 10, most of which is to be re-painted. An emblem 12 is mounted on the hood 10, and as the paintwork around the emblem 12 does not require re-painting, this area of the hood is to be isolated from the remainder. To achieve this, an endless element 14 according to the invention is mounted on the hood 10 to surround the emblem 12. This is shown more clearly in FIG. 5.

As shown in FIG. 5, the web 2 of the element 14 is secured to the hood 10 by the adhesive layer 4. In this embodiment, an adhesive coating 16 is also formed on the opposite surface of the web 2, and a sheet 18 of paper or other suitable material is laid thereover and attached to the web 2 by the adhesive 16 to protect the emblem and its immediate surroundings. Alternatively of course, an adhesive coating can be separately applied to the web 2 or the sheet 18 could be formed with an adhesive coating of its own suitable for securing the sheet to the uncoated exposed surface of the web 2.

The sheet 18 can be cut to size before or after attachment to the element 14. In some embodiments of the invention, the element 14 can be provided with a masking sheet already attached. Generally though, elements according to the invention will be provided without such sheets, and usually in a batch as illustrated in FIG. 3. This will permit the element to be used to mask an enclosed area as illustrated in FIGS. 4 and 5, or to surround such an enclosed area while leaving it exposed for treatment. In the latter application, any sheet of material applied will extend outwards from the element rather than inwards.

Elements according to the invention have particular benefit in effecting paint repairs. The use of a foam web facilitates the achievement of a soft edge between painted and unpainted areas. However, the elements are also useful in applying other surface treatments such as coating, plating and phosphorizing.

I claim:

1. A masking element comprising an elongate web of polymeric foam in a closed curve having inner and outer peripheries and upper and lower surfaces, with said upper and lower surfaces being curved in a cross-section taken along a plane transverse to said web; and a layer of adhesive on at least the lower surface of said web for mounting the element on a substrate to mask an area of the substrate adjacent the inner or the outer periphery of the element.

2. A masking element according to claim 1 wherein the closed curve is a circle.

3. A masking element according to claim 1 wherein the closed curve is a polygon.

4. A masking element according to claim 1 wherein the web has an elliptical cross-section along a plane transverse to said web.

5. A masking element according to claim 1 wherein the web is stamped out in the shape of the closed curve from a sheet of foam with a layer of adhesive on one face thereof.

6. A masking element according to claim 1 wherein the web is stamped out in the shape of the closed curve from a sheet of foam and has pressure welded foam seams defining the inner and outer peripheries of the element.

7. A plurality of substantially concentric masking elements according to claim 6 formed from a common sheet of foam.

8. A plurality of substantially concentric masking elements according to claim 7 with adjacent elements being attached to each other along adjacent peripheries thereof.

9. A plurality of substantially concentric masking elements according to claim 7 with adjacent elements being attached to each other along adjacent peripheries thereof by tearable pressure welded seams.

* * * * *